(12) United States Patent
Dewan et al.

(10) Patent No.: US 7,778,166 B2
(45) Date of Patent: Aug. 17, 2010

(54) SYNCHRONIZING SEQUENCE NUMBERS AMONG PEERS IN A NETWORK

(75) Inventors: Prashant Dewan, Hillsboro, OR (US); Men Long, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 433 days.

(21) Appl. No.: 11/946,722

(22) Filed: Nov. 28, 2007

(65) Prior Publication Data

US 2009/0135827 A1    May 28, 2009

(51) Int. Cl.
*H04J 1/16* (2006.01)
(52) U.S. Cl. ..................... 370/229
(58) Field of Classification Search ............... 370/229, 370/230, 235, 310, 349, 350, 509; 455/410, 455/411; 713/155, 160, 168, 178
See application file for complete search history.

(56) References Cited

U.S. PATENT DOCUMENTS

| | | | | |
|---|---|---|---|---|
| 7,286,515 | B2* | 10/2007 | Olson et al. | 370/338 |
| 7,379,435 | B1* | 5/2008 | Kinder | 370/324 |
| 2007/0006175 | A1* | 1/2007 | Durham et al. | 717/131 |
| 2007/0171827 | A1* | 7/2007 | Scott et al. | 370/235 |
| 2007/0260870 | A1* | 11/2007 | Nissan et al. | 713/150 |
| 2008/0034104 | A1* | 2/2008 | Kariti et al. | 709/231 |
| 2008/0273521 | A1* | 11/2008 | Shao et al. | 370/350 |
| 2009/0034520 | A1* | 2/2009 | Sittin et al. | 370/389 |

OTHER PUBLICATIONS

Internet Key Exchange. Microsoft TechNet. http://www.microsoft.com/technet/prodtechnol/windows2000serv/reskit/cnet/cndb_ips_gxoj.mspx?mfr=true.

* cited by examiner

*Primary Examiner*—Dmitry H Levitan
(74) *Attorney, Agent, or Firm*—Derek J. Reynolds

(57) ABSTRACT

A method and system are disclosed. In one embodiment the method includes a first device sending a stream of packets in a sequence across a network to a second device. In the sequence of packets there are a number of data packets and one or more synchronization packets. The synchronization packets are interspersed throughout the data packets. The method also includes the second device being capable of dropping any of the received data packets in the sequence arriving more than a first delta of time threshold value after the arrival of the most recent synchronization packet.

15 Claims, 4 Drawing Sheets

SYNCHRONIZING SEQUENCE NUMBERS AMONG PEERS IN A NETWORK

FIELD OF THE INVENTION

The invention relates to client/server synchronization and authentication of a stream of sequenced network packets.

BACKGROUND OF THE INVENTION

A growing proliferation of enterprise security is raising the numbers of clients and the servers that have to support wireless and wired security protocols like IPSec (Internet Protocol Security), 802.1i, LinkSec (Link Security), etc. These protocols have mechanisms to synchronize the sequence numbers between the sender and the receiver of network packets in order to protect the client and server from replay attacks. The sequence numbers are bound with a shared key between the sender and the receiver and whenever they go out of synchronization the shared key is renegotiated. In addition, the sender and the receiver both have to maintain the sequence numbers in memory for each key. All of the information regarding the sequence and the shared keys is referred to as a state between a client and server. Although the memory requirements for maintaining these states is not a major issue for the clients, it is cumulative for servers. Any reduction in the volume of states a server has to maintain is always a welcome attribute. One of the predominant reasons for lack of pervasive IPSec adoption in the enterprise is the need for state maintenance at the server.

BRIEF DESCRIPTION OF THE DRAWINGS

The present invention is illustrated by way of example and is not limited by the drawings, in which like references indicate similar elements, and in which.

DETAILED DESCRIPTION OF THE INVENTION

Embodiments of a method and system to dynamically synchronize sequence numbers in a stream of sequenced packets and authenticate the sender of the stream using a network-common time stamp are described. In the following description, numerous specific details are set forth. However, it is understood that embodiments may be practiced without these specific details. In other instances, well-known elements, specifications, and protocols have not been discussed in detail in order to avoid obscuring the present invention.

Figure 1:
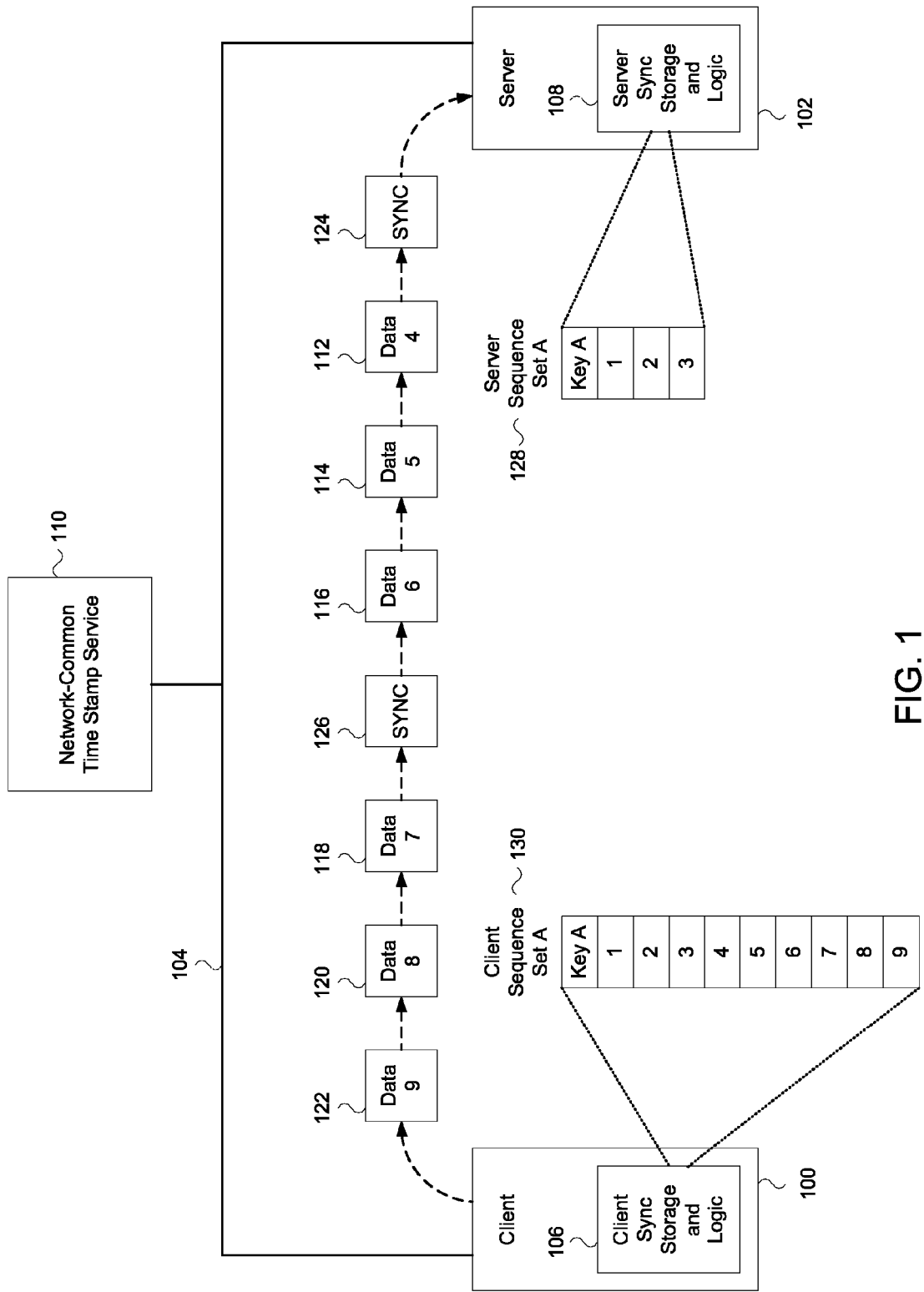
FIG. 1 describes one embodiment of a client-server system capable of dynamically synchronizing sequence numbers of a stream of data packets using a network-common time.

FIG. 1 describes one embodiment of a client-server system capable of dynamically synchronizing sequence numbers of a stream of data packets using a network-common time. In many embodiments, a client system 100 and server system 102 are coupled to a network 104.

The client system 100 may comprise any form of electronic device that can effectively connect and communicate on the network 104. For example, the client system may be a desktop computer system, a laptop computer system, a handheld personal digital assistant, a cell phone, a portable music player, or any other type of network-connectible device. In many embodiments, there are a multitude of client systems connected to network 104, each capable of implementing the embodiments described below. Though, to adequately describe the embodiments below, only one client system is required to be shown.

In different embodiments, the server system 102 may be any form of server from a large corporate or infrastructure server down to a small home network server. In certain embodiments, the functions within the server may be distributed among a number of servers acting congruously.

The network 104 may be a wired network in certain embodiments, which includes a full cabling system between each device coupled to the network (e.g. Ethernet cables, an optical fiber network, coaxial cables, etc.). In other embodiments, the network 104 may be a wireless network utilizing wireless routers, access points, and other wireless infrastructure devices to distribute wireless signals over one or more coverage areas (e.g. IEEE 802.11 type wireless networks, WIMAX (Worldwide Interoperability for Microwave Access), WLAN (Wireless Local Area Network), Bluetooth®, etc.). In yet other embodiments, the network 104 may be a combination of both a wired and wireless network to adequately serve a large and diverse client base.

In many embodiments, the client 100 is capable of sending and receiving packets of information across network 104. The packets may include data packets as well as synchronization packets. In many embodiments, for data integrity and security reasons, the packets are sent in a sequence where each data packet contains a sequence number with respect to the other data packets. For example, a certain sequence of packets may start with a first data packet with a sequence number of "1" and end with a sequence packet of N, where N is the number of related packets sent in sequence.

Additionally, in many embodiments, the server 102 is capable of sending and receiving packets of information across network 104 as well. To expand on the above sequencing example, server 102 is capable of receiving the sequence of packets starting with the packet with sequence number "1". The server 102 expects that each subsequent data packet in the sequence will have a sequence number greater than the previously received data packet.

For example, data packet 4 (112) may utilize sequence number "4", data packet 5 (114) may utilize sequence number "5", and data packet 6 (116) may utilize sequence number "6". Furthermore, data packet 7 (118) may utilize sequence number "7", data packet 8 (120) may utilize sequence number "8", and data packet 9 (122) may utilize sequence number "9". The data packets shown in FIG. 1 are just a representational example of the sequence of packets that can be sent across network 104. Additionally, the number of sequenced data packets in transit on network 104 at any given time may be zero, one, or a number greater than one. The representational example shown in FIG. 1 is utilized to illustrate the sequencing, and does not reflect how many packets are in transit at any given time.

The client 100 constructs and sends each packet in the sequence of packets utilizing client sync storage and logic 106. The client sync storage and logic 106 performs multiple tasks described below. Similarly, the server 102 receives and deconstructs packets in the sequence of packets utilizing server sync storage and logic 108. The server sync storage and logic 108 also performs multiple tasks described below.

In certain embodiments, the client system 100 and server system 102 share two unidirectional keys through an IPSec (Internet Protocol Security) key exchange. These keys may be stored within client and server sync storages in 106 and 108 respectively.

A second type of packet is sent from the client to the server (and vice versa in some embodiments) called a SYNC (synchronization) packet (e.g. SYNC packets 124 and 126). A SYNC packet is a specially crafted IPSec packet using a modified version of the IPSec AH (authentication header) frame format. Table 1 shows the modified IPSec header of a SYNC packet.

TABLE 1

SYNC Packet Modified IPSec Header

| 0 | 7 8 | 15 16 | 31 |
|---|---|---|---|
| Next Header | Payload Length | | RESERVED |
| Security Parameter Index (SPI) | | | |
| Sequence Number Field (Greenwich Mean Time) | | | |
| Authentication Data (Variable) | | | |

A SYNC packet's modified IPSec header is comprised of the next header, the payload length, the security parameter index (SPI), and any authentication data. These items are standard for an IPSec packet header per the defined IPSec protocol. The modification occurs in the interpretation of the sequence number field. In a SYNC packet, a network-common time stamp (in this case, Greenwich Mean Time—GMT) replaces the sequence number. In many embodiments, the network-common time stamp is returned from a query to a network-common time stamp service 110.

The network-common time stamp service 110 may be located on any computer system coupled to network 104. In many embodiments, a special network time server runs this service. This service allows an accurate stamp of time from the network 104 at any given moment. Additionally, this service provides a very precise synchronized time for any agent coupled to the network, such as client 100 and server 102. The discrepancy between the reported time that the network-common time stamp service 110 sends to two separate agents on the network is quite small and can be at most an absolute threshold value that is not exceeded.

To make an initial determination of the authenticity of a received SYNC packet, server 102 can compare the time stamp in the received SYNC packet to the time stamp the server 102 receives from the network-common time service 106. The final client 100 packet construction step, just prior to sending the SYNC packet to the server 102, may be to query the network-common time service 106 for the current network time. The client 100 may use the returned network time as the time stamp in the SYNC packet and then send the SYNC packet to server 102.

In many embodiments, server 102 may stay in synchronous time with the network-common time by occasionally querying the network-common time service 106 for time synchronization updates. Thus, the server's internal clock is synchronized with the network time. This allows server 102 to make a comparison of the SYNC packet's time stamp with the server's own time.

There is a transit time associated with sending the packets across the network 104, thus a delay from the time the SYNC packet is sent from the client 100 to the server 102 is inevitable. On the other hand, the network time reported to the client 100 and server 102 might have a discrepancy as well.

Therefore, due to the above limitations, it is impractical to require the client and server times to be exact replicas. Thus, a threshold delta value between the two time stamps may be predetermined or dynamically determined by the server 102. Either way, an initial security check by the server 102 may include the server comparing it's own time when it receives the SYNC packet to the time stamp embedded within the SYNC packet. In many embodiments, if these two time stamps differ by more than the threshold delta value, the packet may be dropped.

In contrast to the information that makes up the sequence number field in a SYNC packet, the sequence number field in a data packet may simply comprise the current sequence number.

Data and SYNC packets both include the SPI field in their headers so the server 102 may perform a lookup in its local SPI table for the specific SPI in the packet. The SPI is a 32-bit value that combines with the destination address of the packet to identify the security association to be used for the packet. Among other things, the SPI refers to the encryption/decryption session key for the packet.

In some embodiments, in a SYNC packet, the network-common time stamp in the sequence number field is hashed with the session key to provide for an additional level of security to assure the server that a valid client on the network 104 is sending the SYNC packet. In many embodiments, the hash function utilizes a keyed-Hash Message Authentication Code (HMAC) format. Any iterative cryptographic hash function, such as MD5 or SHA-1, may be used in the calculation of the HMAC. Thus, the network-common time stamp, in addition to the standard SPI key, allows the server to compare network time stamps between the client and server system. This comparison can determine if the client time stamp (using GMT) is sufficiently close in time (under the network time server time stamp reporting error variation threshold) to the server time stamp (using GMT) to further validate the SYNC packet's authenticity.

The network-common time stamp also is utilized to determine time deltas between any two sent and/or received SYNC packets. In many embodiments, the server implements a maximum delta time threshold value T between SYNC packets. This allows the server to continually verify the authenticity of the client sending the packets at least once every time delta T.

In many embodiments, a SYNC packet may also have a range of sequence numbers included in the payload. The range of sequence numbers may include all the sequence numbers client 100 has already used to send data packets in the sequence. Thus, server 102 may utilize this range to synchronize with client 100 at the current position in the sequence. For example, server 102 may take the range information and know to expect future sequence numbers that are higher than the sequence numbers in the range.

For example, in many embodiments, at the start of a sequence of packets sent from client 100 to server 102, a SYNC packet is sent from client 100 to server 102. The SYNC packet first verifies with server 102 that client 100 is a genuine client on the network 104 using the SPI key and the network-common time stamp in a hash. Once the client 100 is authenticated, server 102 looks into the payload of the SYNC packet to get the range of sequence numbers. This being the first SYNC packet prior to the first data packet, the sequence would potentially be empty or show a "0" for the highest sequence number in the range. This would indicate to server 102 that it should expect a data packet with a sequence number starting at "1".

Client 100 may then send a number of data packets to server 102 in a sequence starting with "1" and incrementing from there. The server 102 will continue to receive and process these data packets up to a time delta T beyond the time in which it received the first SYNC packet. Time delta T can be any threshold value that the server 102 desires not to exceed between SYNC packets. Thus, in some embodiments, after time delta T has expired, prior to sending any additional data packets, the client 100 will send another SYNC packet that includes the current network-common time stamp, the same SPI key, and a range of sequence numbers that have already been utilized. This will synchronize the sequence number between the server and client as well as re-verify the client's authenticity. At that time the server resets the time stamp counter and will again receive data packets for another full time delta T. In some embodiments, the time stamp counter is an internal counter that occasionally synchronizes with the network-common time stamp. In other embodiments, the client 100 sends a SYNC packet prior to the time between SYNC packets exceeding the time delta T threshold value.

In many embodiments, client 100 and server 102 each store the sequence numbers associated with the sequence set (and key) that have already been utilized. For example, Server Sequence Set A 128 shows the sequence numbers stored within Server Sync Storage and Logic 108. Server 102 cross-checks any newly arriving packets to verify that the packets do not contain sequence numbers that have already been utilized or contain sequence numbers below those that have been utilized. In the same regard, Client Sequence Set A 130 shows the sequence numbers stored within Client Sync Storage and Logic 106. Client 100 utilizes the Client Sequence Set A 130 to determine what the next sequence number to send should be. In some embodiments, these sequence sets may comprise a database that stores each of the sequence numbers utilized. In other embodiments, these sequence sets contain just the last sequence number utilized.

FIG. 1 can be used to illustrate this sequencing example. The first SYNC packet was processed by server 102. At this point server 102 initializes and begins the time T delta time stamp counter. Then three data packets were processed by server 102 (sequence numbers 1, 2, and 3, which are already stored within Server Sequence Set A). Then a second SYNC packet, SYNC packet 124, is received. After verifying the authenticity of SYNC packet 124 using the network-common time stamp and SPI through a hash function, server 102 parses the range of sequence numbers stored in the SYNC packet 124 payload and verifies that the range is 1-3. Thus, server 102 expects the next data packet to arrive with sequence number "4". Additionally, server 102 restarts its time delta T time stamp counter. Then data packets 4-6 (112, 114, and 116) arrive. Then a third SYNC packet 126 arrives to re-authenticate the client and verify the sequence numbers utilized. After that three more data packets arrive, data packets 7-9 (118, 120, and 122). Client Sequence Set A 130 shows that the client is aware of and storing all 9 sequence numbers that have been sent to the server 102. Again, FIG. 1 is shown as an illustrative example, the number of data packets to actually be sent between each SYNC packet is a function of the speed at which data packets are capable of transiting across network 104 and the time delta T value as well as potentially more network and client/server related factors.

If at any point, the server 102 time stamp counter exceeds the time delta T value, the server 102 no longer will accept any data packets from the client, so all subsequent data packets are dropped. In this scenario, to resynchronize, the client is required to send a new SYNC packet. Due to the inefficiencies associated with exceeding the time delta T value and subsequently sending data packets, the client may include its own internal failsafe measures to not send any data packets once time delta T has been exceeded since sending the previous SYNC packet. Thus, in many embodiments, prior to each packet being sent, the client checks to determine if the time since the last SYNC packet has exceeded the time delta T value. If so, the client constructs and sends another SYNC packet prior to sending the next data packet.

In many embodiments, the payload in the packet may be comprised of UDP (user datagram protocol) information. The UDP packet includes a destination port number field. The value in the destination port number field can be utilized to tell the server 102 what type of packet has been received. For example, the server may have set up two UDP ports to receive data, a data port and a SYNC port. If the UDP port number in the packet is targeting the SYNC port, the server 102 knows that the packet is a SYNC packet. With this knowledge, the server 102 can parse the range of sequence numbers sent in the packet payload.

In many embodiments, if the server 102 goes down (due to issues such as power outages, viruses, etc.), then when the server 102 comes back online, the client can resynchronize the sequence number by sending a SYNC packet and a full renegotiation of keys is not necessary to continue processing the stream sequence.

Figure 2:
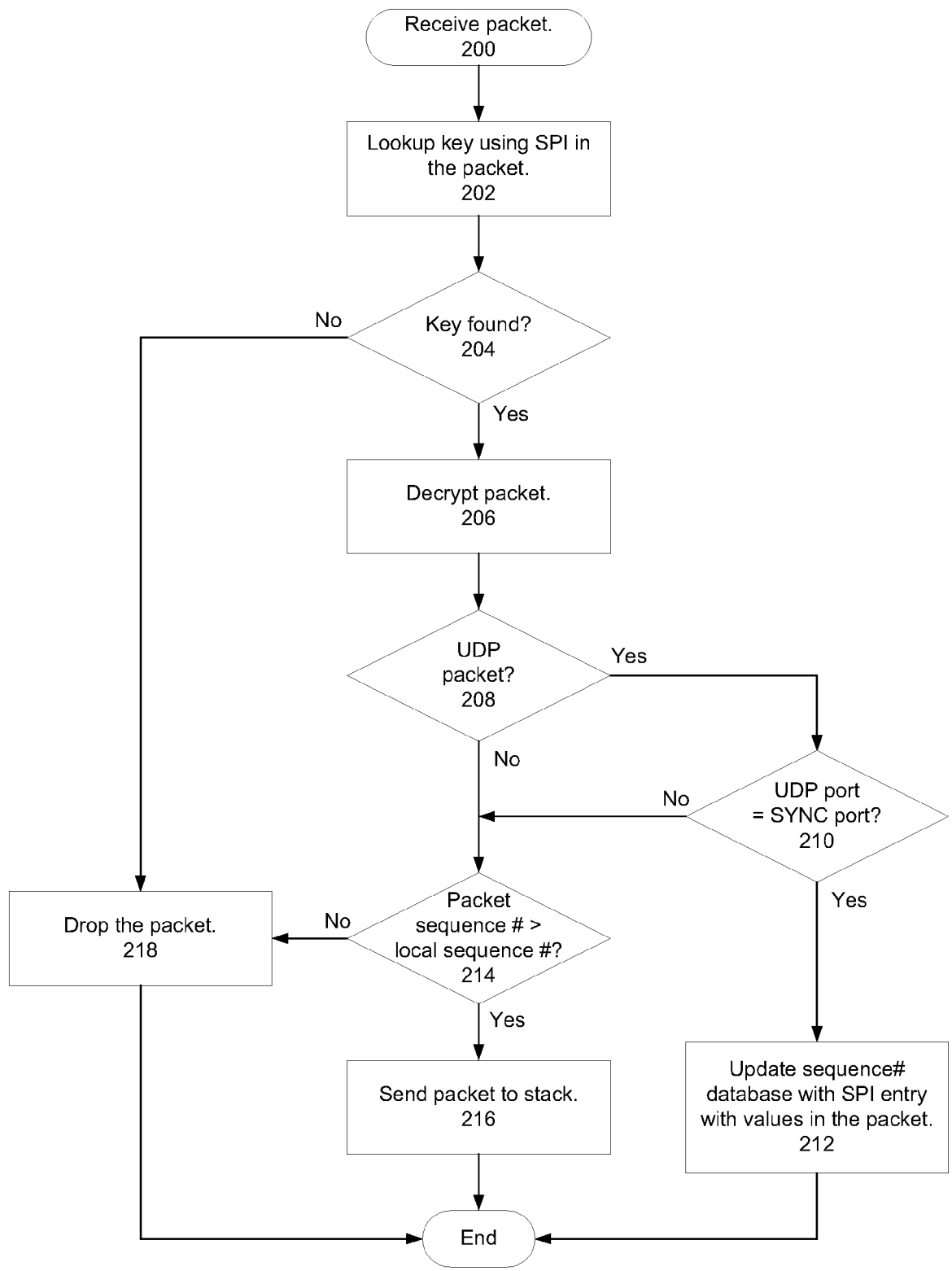
FIG. 2 is a flow diagram of one embodiment of a process for a server to receive a packet in a sequence that can be dynamically synchronized and authenticated using a network-common time.

FIG. 2 is a flow diagram of one embodiment of a process for a server to receive a packet in a sequence that can be dynamically synchronized and authenticated using a network-common time. The process may be performed by hardware, software, or a combination of both. The process begins by processing logic in a server receiving a packet (processing block 200). Then processing logic looks up the key for the packet using the SPI in the packet (processing block 202). This lookup occurs in the server's local SPI database. If the key (i.e. SPI entry in the database) is not found, then processing logic drops the packet (processing block 218).

If the key is found, then processing logic utilizes the key to decrypt the packet (processing block 206). Next, processing logic determines whether the decrypted packet is a UDP packet (processing block 208). If so, then processing logic checks the UDP destination port in the UDP packet to see if it's a SYNC port (processing block 210). If so, then processing logic takes the range of sequence values in the packet and updates its sequence # database set with the range in the packet (processing block 212) and the process is finished.

Otherwise, if the UDP destination port is not a SYNC port or the packet is not a UDP packet at all (e.g. the packet is not a SYNC packet), then processing logic determines if the packet sequence number is greater than the locally stored most recent sequence number in the server's sequence number database (processing block 214). If not, then processing logic drops the packet (processing block 218). Otherwise, if the packet sequencing number is greater than the locally stored most recent sequence number, then processing logic sends the packet to the local network stack for processing (processing block 216) and the process is finished.

Figure 3:
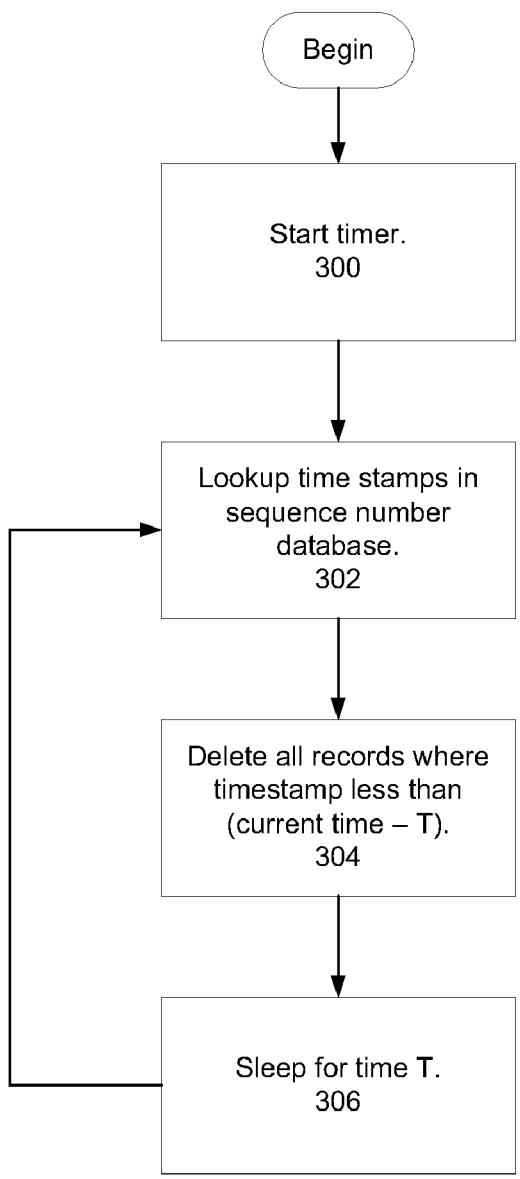
FIG. 3 is a flow diagram of one embodiment of a process for a server to delete packet sequence numbers (and corresponding records).

FIG. 3 is a flow diagram of one embodiment of a process for a server to delete packet sequence numbers (and corresponding records). The process may be performed by hardware, software, or a combination of both. FIG. 3 describes an additional value to store in the sequence sets (such as Server Sequence Set A 128 in FIG. 1). In some embodiments, the server's local time stamp (which may be synchronized with the network-common time stamp) is stored for each data packet received from the client. Thus, for each sequence number in the stored server sequence set, an associated time stamp is also stored. The process in FIG. 3 utilizes these stored time stamps.

Specifically, the process in FIG. 3 begins by processing logic in the server starting a timer (processing block 300). In many embodiments, this timer is the time delta T timer as discussed above in reference to FIG. 1. Then processing logic looks up all of the time stamps in the sequence number database associated with each sequence number (processing block 302). Once all time stamps have been looked up, processing logic deletes all associated records where the time stamp is less than current time—time delta T (processing block 304). In other words, records stored that are older than the maximum time delta between SYNC packets are stale and no longer are trusted due to the time delta threshold being surpassed. Next, processing logic sleeps for time delta T and begins this process again (processing block 306). Thus, every T time, the server will flush out any entry in the sequence set for which no SYNC packet has been received for the last T+1 unit of time.

Figure 4:
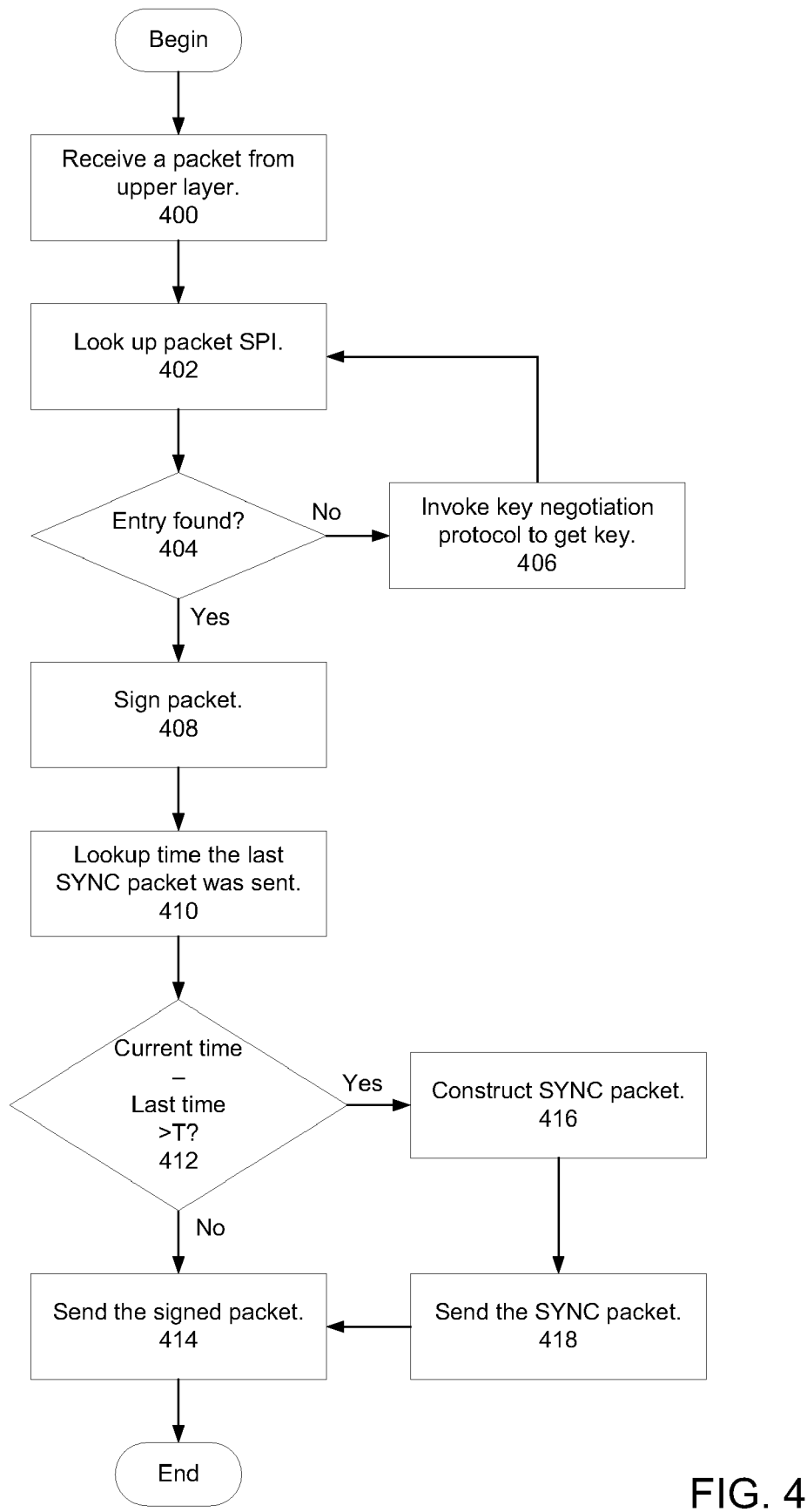
FIG. 4 is a flow diagram of one embodiment of a process for a client to send a packet in a sequence that can be dynamically synchronized and authenticated using a network-common time.

FIG. 4 is a flow diagram of one embodiment of a process for a client to send a packet in a sequence that can be dynamically synchronized and authenticated using a network-common time. The process may be performed by hardware, software, or a combination of both. The process begins by processing logic in a client receiving a data packet from an upper layer in the network stack in the client machine (processing block 400). It is assumed for the purposes of this figure that the client machine (i.e. OS, application, etc) wants this packet delivered to a server on the network.

Then processing logic looks up the SPI (i.e. the encryption/decryption key) for the packet (processing block 402). Next, processing logic determines if an SPI entry for the packet is found (processing block 404). If the entry is not found, then processing logic invokes a local key negotiation protocol to get the key for the packet (processing block 406) and subsequently processing logic looks up the SPI a second time (this time the SPI should be found, after block 406 is processed). Once the entry is found, the processing logic signs the packet using a standard security signing procedure (processing block 408). Next, processing logic looks up the time the last SYNC packet was sent (processing block 410). Then processing logic determines whether the time delta between the current time and the last time a SYNC packet was sent is greater than time T (processing block 412). If the last SYNC packet was sent less than or equal to time delta T ago, then processing logic sends the signed data packet across the network to the server (processing block 414) and the process is finished.

Otherwise, if last SYNC packet was sent greater than time T ago, then processing logic constructs a SYNC packet (processing block 416). Once the SYNC packet is constructed, processing logic sends the SYNC packet across the network to the server (processing block 418). After the SYNC packet is sent, processing logic can then send the signed data packet across the network to the server (processing block 414) and the process is finished.

Thus, embodiments of a method and system to dynamically synchronize sequence numbers in a stream of sequenced packets and authenticate the sender of the stream using a network-common time stamp are described. These embodiments have been described with reference to specific exemplary embodiments thereof. It will be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

What is claimed is:

1. A method, comprising:
a first device sending a stream of packets in a sequence across a network to a second device, the packets comprising a plurality of data packets and one or more synchronization packets interspersed in the plurality of data packets; and
the second device dropping any of the received data packets in the sequence arriving more than a first delta of time threshold value after the arrival of a most recent synchronization packet of the one or more synchronization packets.

2. The method of claim 1, wherein each of the one or more synchronization packets comprises at least a security parameters index key, a network-common time stamp retrieved from the network, and one or more updated sequence numbers.

3. The method of claim 2, further comprising:
after receiving a first synchronization packet, the second device comparing the network-common time stamp in the first synchronization packet with a current time received from the network; and
the second device updating one or more local sequence numbers with the one or more updated sequence numbers from the first synchronization packet when the network-common time stamp and the current time received from the network differ by less than a second delta of time threshold value.

4. The method of claim 1, wherein each of the plurality of data packets comprises at least a security parameters index key and a packet sequence number.

5. The method of claim 4, further comprising:
after receiving a first data packet, the second device decrypting the received first data packet when the security parameters index key in the first data packet is equal to a security parameters index key currently stored in a local security parameters index storage table; and
the second device dropping the first data packet when the security parameters index key in the first data packet is not stored in the local security parameters index storage table.

6. The method of claim 5, further comprising:
after decrypting the first data packet, the second device sending the first data packet to a network interface protocol stack when a packet sequence number in the first data packet is greater than a locally stored sequence number for the stream; and
the second device dropping the first data packet when the packet sequence number in the first data packet is not greater than the locally stored sequence number for the stream.

7. The method of claim 1, further comprising:
the first device updating a timestamp counter immediately upon sending each of the one or more synchronization packets.

8. The method of claim 7, further comprising:
prior to sending a next data packet of the plurality of data packets, the first device checking a current delta of time between the current time and the time stamp of the most recently sent synchronization packet; and
the first device sending a next synchronization packet to the second device prior to sending the next data packet of the plurality of data packets when the current delta of time is greater than the first delta of time threshold value.

9. A system, comprising:
  a network;
  a first device, coupled to the network, to send a stream of packets in a sequence, across the network, to a second device coupled to the network, the packets comprising a plurality of data packets and one or more synchronization packets interspersed in the plurality of data packets; and
  the second device to drop any of the received data packets in the sequence arriving more than a first delta of time threshold value after the arrival of a most recent synchronization packet of the one or more synchronization packets.

10. The system of claim 9, wherein each of the one or more synchronization packets comprises at least a security parameters index key, a network-common time stamp retrieved from the network, and one or more updated sequence numbers.

11. The system of claim 10, wherein the second device is further operable to:
  compare the network-common time stamp in a first synchronization packet with a current time received from the network; and
  update one or more local sequence numbers with the one or more updated sequence numbers from the first synchronization packet when the network-common time stamp and the current time received from the network differ by less than a second delta of time threshold value.

12. The system of claim 9, wherein each of the plurality of data packets comprises at least a security parameters index key and a packet sequence number.

13. The system of claim 12, wherein the second device is further operable to:
  after receiving a first data packet, decrypt the received first data packet when the security parameters index key in the first data packet is currently is equal to a security parameters index key stored in a local security parameters index storage table; and
  drop the first data packet when the security parameters index key in the first data packet is not stored in the local security parameters index storage table.

14. The system of claim 13, wherein the second device is further operable to:
  send the first data packet to a network interface protocol stack when a packet sequence number in the first data packet is greater than a locally stored sequence number for the stream; and
  drop the first data packet when the packet sequence number in the first data packet is not greater than the locally stored sequence number for the stream.

15. The system of claim 9, wherein the first device is further operable to:
  store a time stamp immediately upon sending each of the one or more synchronization packets;
  prior to sending a next data packet of the plurality of data packets, check a current delta of time between the current time and the time stamp of the most recently sent synchronization packet; and
  send a next synchronization packet to the second device prior to sending the next data packet of the plurality of data packets when the current delta of time is greater than the first delta of time threshold value.

* * * * *